US010248878B2

(12) United States Patent
Zhu

(10) Patent No.: US 10,248,878 B2
(45) Date of Patent: Apr. 2, 2019

(54) CHARACTER INPUT METHOD AND SYSTEM AS WELL AS ELECTRONIC DEVICE AND KEYBOARD THEREOF

(75) Inventor: Lin Zhu, Shanghai (CN)

(73) Assignee: INTSIG INFORMATION CO., LTD., Shanghai (CN)

( * ) Notice: Subject to any disclaimer, the term of this patent is extended or adjusted under 35 U.S.C. 154(b) by 1150 days.

(21) Appl. No.: 12/934,068

(22) PCT Filed: Jun. 3, 2010

(86) PCT No.: PCT/CN2010/073494
§ 371 (c)(1),
(2), (4) Date: Sep. 23, 2010

(87) PCT Pub. No.: WO2011/009343
PCT Pub. Date: Jan. 27, 2011

(65) Prior Publication Data
US 2011/0175815 A1    Jul. 21, 2011

(30) Foreign Application Priority Data

Jul. 21, 2009 (CN) .......................... 2009 1 0055150

(51) Int. Cl.
*G06F 3/02* (2006.01)
*G06K 9/20* (2006.01)
*G06F 3/0488* (2013.01)

(52) U.S. Cl.
CPC ....... *G06K 9/2081* (2013.01); *G06F 3/04883* (2013.01); *G06K 2209/01* (2013.01)

(58) Field of Classification Search
USPC ................................................ 345/156–184
See application file for complete search history.

(56) References Cited

U.S. PATENT DOCUMENTS 5,845,008 A * 12/1998 Katoh .................... G07D 7/12
382/135
2002/0051575 A1* 5/2002 Myers .................. G06K 9/3258
382/202
(Continued)

FOREIGN PATENT DOCUMENTS

CN          1484165 A          3/2004
CN         03149814.0          3/2004
(Continued)

OTHER PUBLICATIONS

International Search Report of PCT/CN2010/073494.
(Continued)

*Primary Examiner* — Joseph R Haley
*Assistant Examiner* — Emily J Frank
(74) *Attorney, Agent, or Firm* — Arch & Lake LLP

(57) ABSTRACT

The invention discloses an electronic character input method and a system. The method comprises imaging the text message with an optical imaging device, converting the pointed text information in the text image into character text through an optical character recognition module; and inputting the recognized character text into a current text in process. In addition, modification can be made by inputting the modified character text into the current text in process. A user can utilize a built-in camera to take a text image for characters to be input, obtain a character text corresponding to the text image through recognition and conversion, input the character text into the text which is currently processed by the intelligent device without inputting the characters in the text image one by one on a keyboard or a touch screen, thereby saving labor and time.

19 Claims, 9 Drawing Sheets

(56) References Cited

U.S. PATENT DOCUMENTS

| | | | |
|---|---|---|---|
| 2004/0017940 A1* | 1/2004 | Kurokawa | G06F 3/0486 382/173 |
| 2004/0141644 A1 | 7/2004 | Kurosawa | |
| 2004/0223197 A1* | 11/2004 | Ohta | G06F 17/30271 358/538 |
| 2004/0252887 A1 | 12/2004 | Lim | |
| 2005/0008264 A1* | 1/2005 | Iida | G06F 17/30265 382/305 |
| 2005/0052558 A1 | 3/2005 | Yamazaki | |
| 2005/0288932 A1* | 12/2005 | Kurzweil | G06K 9/00993 704/260 |
| 2007/0146325 A1* | 6/2007 | Poston | G06F 3/0317 345/163 |
| 2007/0157084 A1* | 7/2007 | Yano | H04N 1/00421 715/234 |
| 2007/0279711 A1* | 12/2007 | King | G06K 9/228 358/508 |
| 2008/0062136 A1* | 3/2008 | Nakamura | G06F 3/0236 345/171 |
| 2008/0233980 A1* | 9/2008 | Englund | G06F 17/289 455/466 |
| 2009/0092317 A1* | 4/2009 | Nagarajan et al. | 382/173 |
| 2010/0103481 A1* | 4/2010 | Morimoto et al. | 358/474 |

FOREIGN PATENT DOCUMENTS

| | | |
|---|---|---|
| CN | 1595944 A | 3/2005 |
| CN | 1641681 A | 7/2005 |
| CN | 20041001567131 A | 7/2005 |
| CN | 101241395 A | 8/2008 |
| CN | 200710035595.4 A | 8/2008 |
| CN | 101609365 A | 12/2009 |
| CN | 200910055150.1 | 12/2009 |
| JP | H04340681 A | 11/1992 |
| JP | H05274468 A | 10/1993 |
| JP | P1995-151490 | 6/1995 |
| JP | 096898 A | 1/1997 |
| JP | 11167569 | 6/1999 |
| JP | 11-212964 | 8/1999 |
| JP | P2004-341977 | 12/2004 |
| JP | P2005-346628 A | 12/2005 |

OTHER PUBLICATIONS

Chinese Office Action issued in corresponding CN Patent Application No. 200910055150.1, dated Oct. 21,2010, 6 pages.
Chinese Office Action issued in corresponding CN Patent Application No. 200910055150.1, dated May 12, 2010, 3 pages.
Chinese Notification to Grant issued in corresponding CN Patent Application No. 200910055150.1, dated Aug. 14, 2012, 1 page.
Chinese Decision of Reexamination issued in corresponding CN Patent Application No. 200910055150.1, dated Apr. 11, 2012, 1 page.
Chinese Office Action issued in corresponding CN Patent Application No. 200910055150.1, dated Dec. 26, 2011, 10 pages.
Japanese Office Action (including English translation) issued in corresponding JP Patent Application No. 2011-523296, dated Mar. 5, 2013, 2 pages.
Japanese Office Action (including English translation) issued in corresponding JP Patent Application No. 2011-523296, dated Aug. 14, 2012, 2 page.
European Office Action issued in corresponding EP Patent Application No. 10757552.4, dated Nov. 16, 2018, 8 pages.
European Office Action issued in corresponding EP Patent Application No. 10757552.4, dated Feb. 26, 2018, 26 pages.
Response to European Office Action filed Aug. 22, 2018 in corresponding EP Patent Application No. 10757552A, 23 pages.
European Communication issued in corresponding EP Patent Application No. 10757552.4, dated Jun. 15, 2015, 1 page.
European Extended Search Report issued in corresponding EP Patent Application No. 10757552.4, dated Jun. 9, 2015, 8 pages.
Korean Notice of Preliminary Rejection (including English translation) issued in corresponding KR Patent Application No. 10-2010-7017637, dated Jan. 10, 2012, 27 pages.
Korean Notice of Allowance (including English translation) issued in corresponding KR Patent Application No. 10-2010-7017637, dated Feb. 28, 2013, 3 pages.
KR Office Action (including English translation) issued in corresponding KR Patent Application No. 10-2010-7017637, dated Mar. 6, 2012, 18 pages.

* cited by examiner

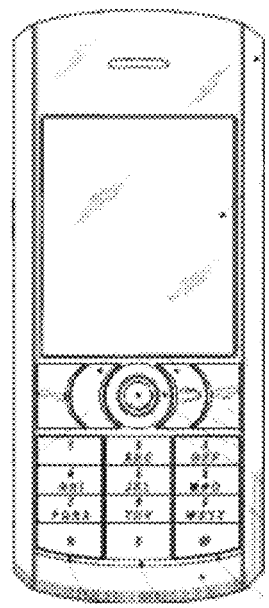

Figure 1

U.S White House Spokesman believes American Economy Growth Will Undoubtedly Slow Down

Washington (Xinhua) 22th January (Hufang, Liuhou)-U.S White House spokeswoman Perino said, at 22th, "American economy growth slows down undoubtedly, but we do not predict the coming of recession".

In Congress testify, US Federal Reserve Board Chairman, Bernanke, indicated the growth of American economy will slow down in this year, but he does not think recession is coming either.

Figure 2

U.S White House Spokesman believes American Economy Growth Will Undoubtedly Slow Down Washington (Xinhua) 22th January (Hufang, Liuhon)-U.S White House spokeswoman, Perino said, at 22th, "American economy growth slows down undoubtedly, but we do not predict the coming of recession".

In Congress testify, US Federal Reserve Board Chairman, Bernanke, indicated the growth of American economy will slow down in this year, but he does not think recession is coming either.

Figure 10

U.S White House Spokesman believes American Economy Growth Will Undoubtedly Slow Down

Washington (Xinhua) 22th January (Hufang, Liuhon)-U.S White House spokeswoman, Perino said, at 22th, "American economy growth slows down undoubtedly, but we do not predict the coming of recession".

In Congress testify, US Federal Reserve Board Chairman, Bernanke, indicated the growth of American economy will slow down in this year, but he does not think recession is coming either.

Figure 11

| | | | | |
|---|---|---|---|---|
| Economy | Washington | | | |
| Growth | (Xinhua) | | | |
| Slows | January | | | |
| Down | 22 | | | 1211 |
| Undoubtedly | ( | Economy | U.S. | Vertical Direction |
| , | Hufang, | Growth | White | From Top to Bottom |
| " | Liuhong | Will | House | |
| But | ) | Undoubtedly | Spokeswoman | |
| " | U.S. | Slow | Believes | |
| We | White | Down | American | |
| Do | House | | | 1212 |
| Not | Spokeswoman | | | From Right to Left |
| Predict | Perrino | | | |
| The | Said | | | |
| Coming | On | | | |
| Of | 22th | | | |
| Recession | " | | | |
| . | American | | | |
| " | | | | |

FIG. 12

CHARACTER INPUT METHOD AND SYSTEM AS WELL AS ELECTRONIC DEVICE AND KEYBOARD THEREOF

CROSS REFERENCE TO RELATED PATENT APPLICATION

The present application is the US national stage of PCT/CN2010/073494 filed on Jun. 3, 2010, which claims the priority of the Chinese patent application No. 200910055150.1 filed on Jul. 21, 2009, which application is incorporated herein by reference.

BACKGROUND OF THE INVENTION

Field of Invention

The present invention is generally related to the technical field of character input in image processing, more specifically to a character input method based on the optical character recognition technology; meanwhile, the invention also relates to a character input system; moreover, the invention relates to an electronic device with the character input system thereof.

Description of Related Arts

In recent years, along with the increasing popularization of electronic devices such as mobile phones, PDAs, hand-held game consoles, navigators, etc., character input methods have become the most basic and common means for performing human-computer interaction.

Currently, there are two common character input methods. One is the keyboard input method in which a user utilizes a keyboard of an intelligent device to input a character through one or more keystrokes. For example, the blackberry mobile phone of the RIM Company adopts a keyboard for inputting characters (shown in FIG. 1). The method has the advantage that a user can use a thumb to carry out input operation by one hand and gets a specific feedback after each keystroke, and various language inputs can be realized through defining the combination of keys. Its disadvantage is that one character input needs many keystrokes, and a user needs to learn corresponding key combinations of characters, for example, inputting a Chinese character with pinyin; moreover, input mode needs to be switched when inputting different types of characters.

The other common input method is the touch screen input method, by which a user can input a character by clicking a virtual keyboard on the touch screen of an intelligent device, or directly writing a character on the touch screen with a touch-pen. As a result the handwriting is recognized and then converted into characters. The virtual keyboard input method has advantages and disadvantages similar to the keyboard input method. The advantage of the handwriting input is that a user just writes a character on the touch screen to realize character input without learning the key combination rules of characters. The disadvantages are, first the input speed is relatively low; second, the operation requires two hands, one hand holding the device, and the other hand holding a touch pen to write; third, recognition errors on scrawl handwriting further reduces the input speed; and fourth, inputting different types of characters requires switching input mode.

People often need to input text contents of books, magazines, advertisements and the like into an intelligent device in daily life, such as famous saying and epigrams, phone numbers, websites, email addresses, etc. FIG. 2 shows an example of a text image containing a text content. According to the prior art. It takes time to type text into an intelligent device character by character having to concentrate on the input and the text content back and forth. Therefore, there is a need for a fast character input technique on the intelligent devices.

SUMMARY OF THE INVENTION

Consistent with embodiments of the present invention, a character input method to input a text message on an electronic device is provided, the method comprises step A, providing a built-in imaging device; step B, imaging the text message with the imaging device; step C, recognizing pointed text in the text image through an optical character recognition module; step D, converting the pointed text into a character text through the optical character recognition module, and Step E, inputting the character text into the electronic device.

Consistent with embodiments of the present invention, a character input system in an electronic device for inputting text messages is disclosed. The electronic device comprises: an imaging device for obtaining character images and a display unit for displaying the character images; and the character input system comprises an optical character recognition module for recognizing the pointed character image information; and a preview box of the imaging device in the display unit; and a preview box adjusting module for adjusting the shape of the preview box of the imaging device in the display unit according to the scope of the text message.

Meanwhile, the invention provides a character input system matched with the character input method.

In addition, the invention provides an electronic device containing the character input system.

Moreover, the invention provides a keyboard matched with the character input method.

In order to solve above technical problems, the invention adopts the following technical scheme:

a character input method, which comprises the following steps:

A, inputting a text through an electronic device;

B, selecting a photography input procedure and starting a photographing device during text input;

C, taking a text image with the photographing device;

D, recognizing pointed text information in the text image into a character text through an optical character recognition module;

E, inputting the recognized character text into a current text in process; or after modification, inputting the modified character text into the current text in process.

As a preferable scheme of the invention, during text input, a user can select the photography input procedure once or many times at any time to input characters through the step B to the step E, and the characters and other characters inputted by other input methods form a text to be input by the user.

As a preferable scheme of the invention, in the step C, the photographing device takes a text image, the display unit of the electronic device displays at least one photography preview box of the photographing device, and characters to be input are contained in the preview box; in the step D, the optical character recognition module recognizes the pointed text image in the preview box.

As a preferable scheme of the invention, the steps C further includes a step of adjusting the shape of the preview box through a preview box adjusting module; a user can adjust the shape of the preview box through the preview box adjusting module according to the scope of the text to be input.

As a preferable scheme of the invention, the display unit is a touch display unit; a user carries out a touch action on the touch display unit to input a shape of the preview box according to the scope of the text to be input; the preview box adjusting module obtains the touch action to set the shape of the preview box according to the touch action.

As a preferable scheme of the invention, in the step B, select "camera input" in a pop-up input menu to start a built-in camera of the electronic device; or press a camera key of the intelligent device to start the built-in camera of the electronic device; or click a camera input key on the keyboard to start up the built-in camera of the electronic device.

As a preferable scheme of the invention, the preview box contains a mark of character direction for marking the direction of characters; the step C also includes a step of changing the mark direction through a mark modification unit; in the step D, the optical character recognition module recognizes the arrangement sequence of characters according to the character direction.

A character input system, which is installed in an electronic device for inputting characters;
the electronic device comprises:
a photographing device used for obtaining image information; and
a display unit used for displaying various information;
the character input system comprises:
an optical character recognition module used for recognizing the pointed text information in image information obtained by the photographing device into a character text; and
a preview box adjusting module used for adjusting the shape of the preview box of the photographing device in the display unit according to the scope of a text to be input.

As a preferable scheme of the invention, the display unit is a touch display unit; a user performs a touch action on the touch display unit to input a shape of the preview box according to the scope of the text to be input; the preview box adjusting module obtains the touch action to set the shape of the preview box according to the touch action.

An electronic device, which is characterized by comprising:
a photographing device used for obtaining image information;
a display unit used for displaying various information; and
the character input system.

A keyboard matched with the character input method, which comprises a key for activating photography input.

A character input method, which comprises the following the steps:
A', inputting a text through an electronic device;
B', selecting a text recognition input procedure during text input and selecting a text image containing characters to be input;
C', recognizing the pointed text information in the text image into a character text through an optical character recognition module;
D', inputting the recognized character text into a current text in process; or after modification, inputting the modified character text into the current text in process.

As a preferable scheme of the invention, in the step C', the display unit of the electronic device displays a selecting box, and characters to be input are contained in the selecting box through adjusting the selecting box; in the step D', the pointed text image in the selecting box is recognized by the optical character recognition module.

As a preferable scheme of the invention, the step C' also includes a step of adjusting the shape of the selecting box through a selecting box adjusting module; a user can adjust the shape of the selecting box through the selecting box adjusting module according to the scope of the text to be input.

As a preferable scheme of the invention, the display unit is a touch display unit; a user performs a touch action on the touch display unit to input a shape of the selecting box according to the scope of the text to be input; the selecting box adjusting module obtains the touch action to set the shape of the selecting box according to the touch action.

A character input method comprises the following steps:
The method requires an intelligent device which is provided with a built-in camera and has function of optical character recognition; the memory of the device stores a program which controls and commands a CPU to execute the following operations: starting the built-in camera, arranging characters to be input in a photography preview window, carrying out photography operation with the built-in camera, obtaining a text image containing the characters to be input, recognizing the characters in the text image with the optical character recognition technology, converting the recognized characters into a character string, and inputting the character string into a text processed by the device currently.

As a preferable scheme of the invention, the method comprises the following specific operation steps:
step 420, starting: preparing to input characters for the current text in process, activating the method, starting the built-in camera and entering a camera photography preview interface;
starting a built-in camera of an intelligent device and displaying the camera photography preview box on a display;
step 430, taking a text image;
arranging characters to be input in the camera photography preview box, and taking a text image of the characters with the built-in camera;
step 440, recognizing the text image into a character text with the optical character recognition technology;
recognizing the text image processed in step 430 with the optical character recognition technology to obtain a corresponding character text;
step 450, inputting the character text into a current text in process directly or not;
a user decides whether or not to directly input the character text processed in step 440 into a current text in process, goes to step 460 if yes, and goes to step 470 if not;
step 460, inputting the character text into the current text in process;
inputting the character text processed in step 440 into the current text in process, and then turning to step 490;
step 470, modifying the character text;
a user modifies the character text processed in step 440;
step 480, a user determines whether or not to input the character text processed in step 470 into the current text in process, then inputs the character text processed in step 470 into the current text in process if yes, and goes to step 490 if not;
step 490, ending.

As a preferable scheme of the invention, in the step 420, select "camera input" in a pop-up input menu to start the built-in camera of the intelligent device; or
in the step 420, press a camera key of the intelligent device to start the built-in camera of the intelligent device; or in the step 420, click a camera icon to start the built-in camera of the intelligent device.

The invention has the advantages that: with the character input method and system provided by the invention, a user can utilizes a built-in camera of an intelligent device to capture a text image containing characters to be input, obtains a character text corresponding to the text image through recognition and conversion and inputs the character text into a text currently processed by the intelligent device without inputting the characters in the text image one by one with a keyboard or a touch screen, thereby saving labor and time. The more characters to be input contained in the text image, the more time and labor saved.

BRIEF DESCRIPTION OF THE DRAWINGS

FIG. 1 is a picture of a handheld device with a keyboard for inputting characters.

FIG. 2 is a text image of characters captured by a built-in camera of an intelligent machine.

FIG. 10 is a default rectangular preview box/selecting box when a user needs to capture/select a text image of characters.

FIG. 11 shows an example of an adjusted preview box/selecting box.

FIG. 12 shows the capability of capturing a text image of vertically situated characters, consistent with the current invention.

DETAILED DESCRIPTION OF THE INVENTION

The present invention is further explained in detail according to the accompanying drawings. It should be noted that figures are schematic representations of devices, and may not be drawn to scale.

The First Embodiment

Figure 3:
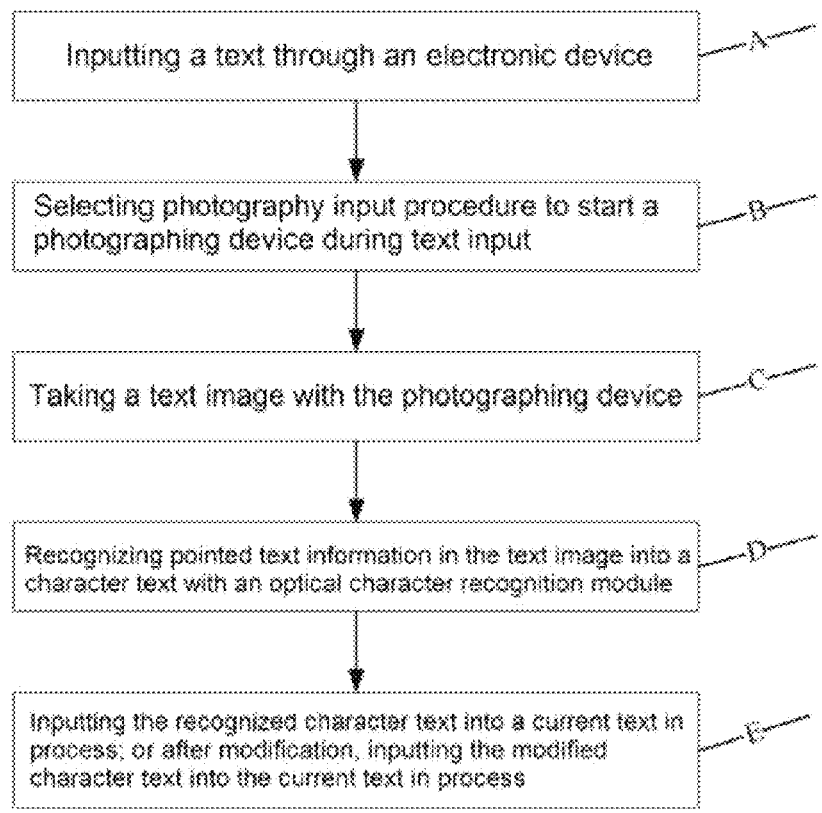
FIG. 3 is the operation flow chart of the character input method consistent with the first embodiment of the current invention.

Referring to FIG. 3, the character input method disclosed i utilizes a built-in imaging device of an intelligent device to take a text image of characters as an input, the characters in the text image is recognized by the optical character recognition technology, then the text image is converted into a character text, and high-efficiency character input is completed. The character input method comprises the following steps:

Step A, carrying out character input through an electronic device such as a mobile phone, a computer, a PDA, etc. In this embodiment, the device is required to be connected with or provided with an imaging device and an optical character recognition module.

Step B, selecting imaging input procedure to start the imaging device during text input.

Figure 8:
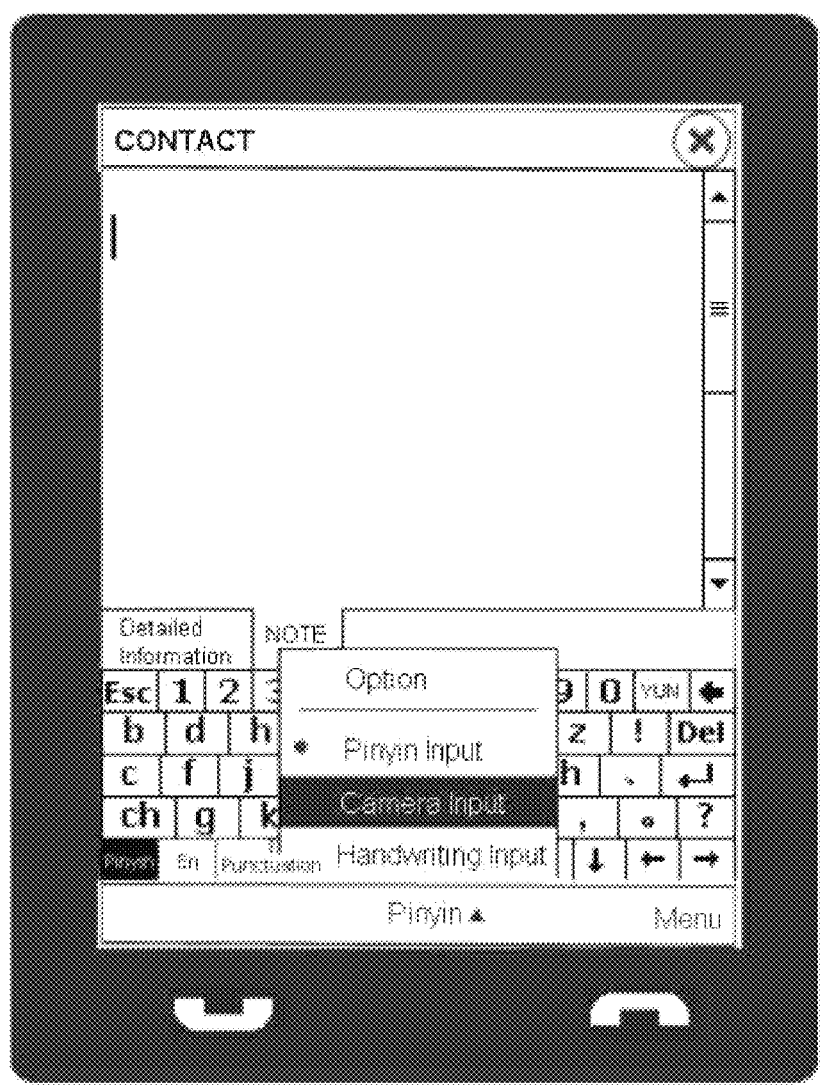
FIG. 8 shows the display screen letting a user to select "camera input" in a pop-up menu to activate the method.
Figure 9:
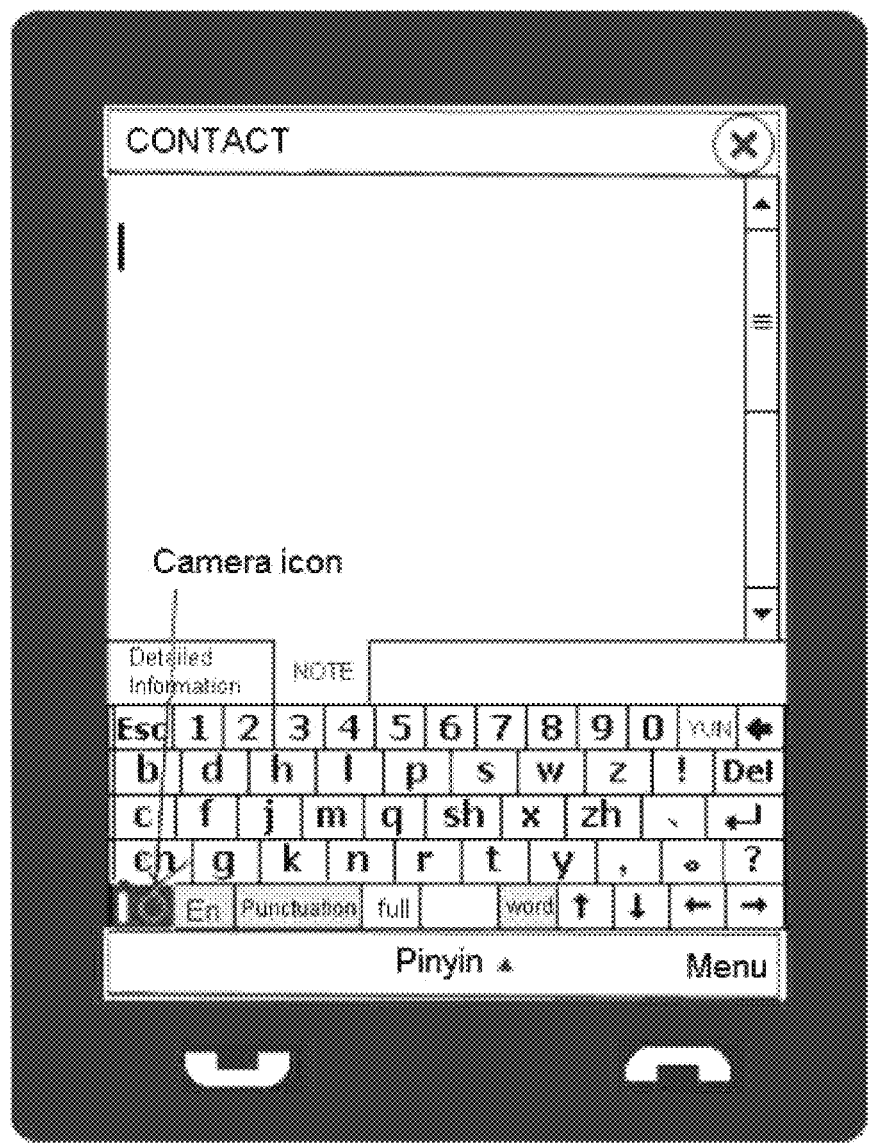
FIG. 9 shows the display screen letting a user to click a camera icon to activate other input method.

To start the built-in imaging device, select "camera input" in a pop-up input menu in the intelligent device (shown in FIG. 8); or press a camera key of the intelligent device; or click a camera input key on the keyboard (shown in FIG. 9).

Step C, taking a text image with the imaging device.

Figure 7:
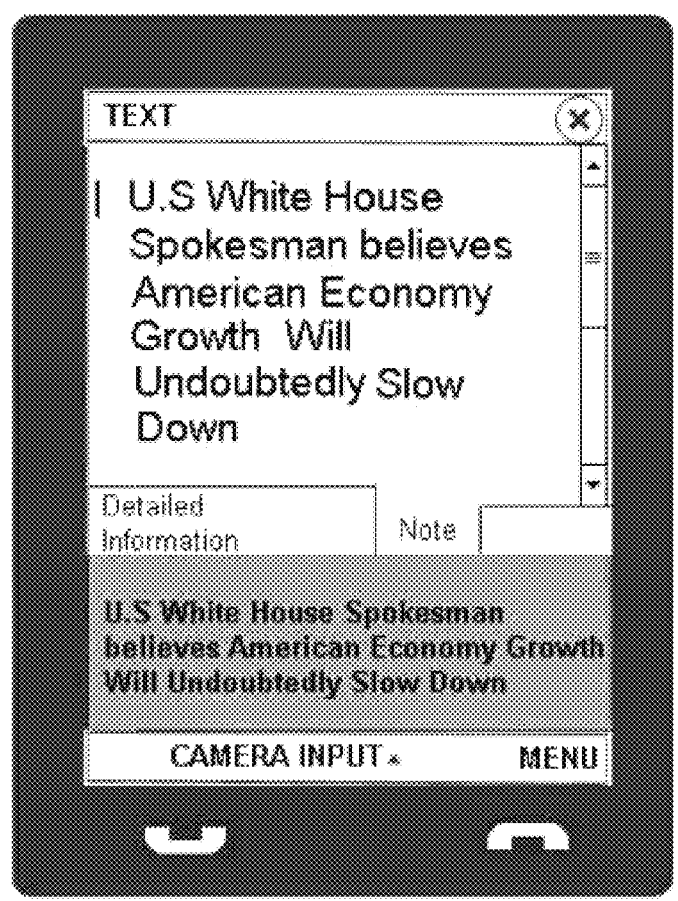
FIG. 7 shows a display on a handheld device: the top part is a text image containing characters captured by a built-in camera and the lower gray part shows the recognized characters by the optical character recognition technology.

Step D, recognizing the pointed text information in the text image and converting it into a character text with the optical character recognition module (shown in FIG. 7). If no pointed information exists, a user needs to perform default recognition of all text information in the full text image.

Step E, inputting the recognized character text into a current text in process; or inputting modified character text into the current text in process after some modifications.

During text input, a user can select an image input procedure once or more times at any moment to start a process of inputting characters through the steps B to E, and the characters from this process and other input methods form a single text for this user.

In step C, a image preview box of the imaging device is displayed on the display unit of the electronic device, in which characters to be input are contained, the text image in the preview box is marked as recognized, and then the text image is photographed. The default preview box can be a rectangular box (shown in FIG. 10), with adjustable length and width. However, the preview box's shape is not limited to rectangular only, it can have other shapes. In step D, the pointed text image in the preview box is recognized by the optical character module. The number of the preview boxes can be one or more.

Preview box settings enable selected text information to be recognized more accurately, thus improving the recognition efficiency in step D. The preview box setting is just an effective implemention scheme; it maybe neglected (or the preview box is the display scope of the whole display unit), in this case, in step D, all characters in the text image are recognized generally; then a user needs to modify recognized characters.

Preferably, a step to adjust the preview box's shape through a preview box adjusting module is included before the text image is imaged; a user adjusts the preview box's shape through the preview box adjusting module according to the scope of the input text. For example, a preview box shown in FIG. 11 is adjusted in various ways; the preview box can be in another shape such as a circle, an ellipse, a rhomb, a triangle, etc.

If the display unit is a touch display, a user performs a touch action on the touch display unit choose the preview box's shape according to the scope of the input; the preview box adjusting module obtains the touch action to set the preview box's shape according to the touch action.

If the display unit is a non-touch display, a user can draw a preview box through a keyboard by, for example, adding a line through a menu, and then adjusting the length of the line, moving the line through directional keys and finally completing a preview box.

The above preview box settings can improve the efficiency of recognition and information modification if a text image has an irregular overall shape.

In addition, this technique can recognize a text image in a vertical layout (show in FIG. 12). In this case, many errors might occur in recognizing characters with the default recognition mode (default recognition mode is based on horizontal layout). So recognizing vertical texts is a challenge.

Accordingly, in step C of the embodiment, a character direction mark is included in the preview box when a text image is photographed; for instance, the default character direction is horizontal, from left to right, and from top to bottom.

There are two direction mark sets in the embodiment. One is the primary mark for a character either in horizontal layout or in vertical layout; the other is a secondary mark which marks the direction of multi-row characters, i.e., from top to bottom or from bottom to top, or marks the direction of multi-column characters, i.e. from left to right or from right to left. A user can first set the primary marks, and then set the secondary marks.

For more character directions, a user can change the direction of the marks through a mark modification unit (as shown in FIG. 12). In FIG. 12, for example, the default character direction is horizontal, from left to right and from top to bottom; the changed character direction is vertical, from top to bottom and from right to left. In FIG. 12, the first mark 1211 indicates that the texts in the rectangular box should be read from top to bottom first in each column. The second mark 1212 indicates that the texts should be read from right to left from the first column to the second column.

In step D, the optical character recognition module recognizes the characters sequence according to the character direction marks. The marks can be directly displayed in the image as being recognized by the optical character recognition module, or forms an encoded file package which is sent to the optical character recognition module. The optical character recognition module can decode the character directions from the file.

Figure 4:
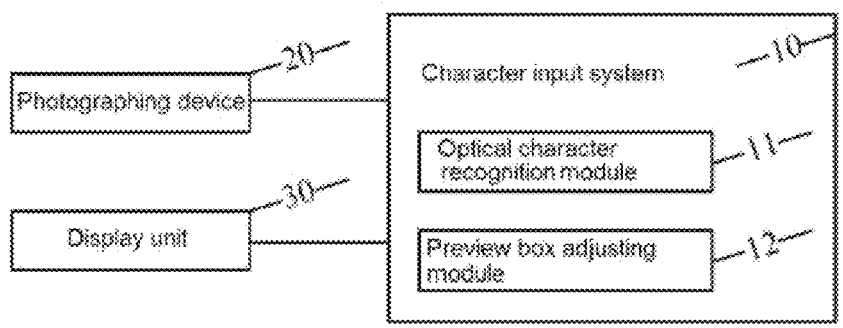
FIG. 4 shows the schematic diagram of the character input system consistent with the first embodiment of the current invention.

Referring to the FIG. 4, the invention discloses a character input system 10, which is installed in an electronic device for inputting characters. The electronic device includes a photographing device 20 and a display unit 30. The photographing device 20 is used for obtaining image information; and the display unit 30 is used for displaying various options.

The character input system also includes an optical character recognition module 11 and a preview box adjusting module 12. The optical character recognition module 11 is used for recognizing the pointed text information in the image information obtained by the photographing device into a character text; the preview box adjusting module 12 is used for adjusting the shape of the preview box of the photographing device on the display unit 30 according to the scope of the input text.

Preferably, the display unit 30 is a touch display unit. A user performs a touch action on the touch display unit 30 to input the preview box' shape according to the scope of the input text; the preview box adjusting module 12 obtains the touch action to set the preview box's shape according to the touch action.

The electronic device can be a mobile phone, a computer, a PDA, a handhold game console, a navigator, etc.

The photographing device can be a camera, a diode, or another types of imaging device.

A keyboard matched with the character input method of the invention comprises a key for activating imaging input. The keyboard can be a real keyboard or an electronic keyboard on a touch screen.

In summary, the character input method and the system provided by the invention enable a user to obtain a character text corresponding to the input text image through an imaging and optical recognition technique without having to input the characters one by one on a keyboard or a touch screen, thereby saving labor and time.

In the course of short message editing, a user can introduce the camera and the optical character recognition module at any time during the editing to photograph and recognize a large or small section of the characters. For example, during short message editing, a user can input a few characters by handwriting or pinyin, then input a few characters with photography and OCR (optical character recognition), input character by handwriting or pinyin again, and input characters with photography and OCR at another location again.

The Second Embodiment

Figure 5:
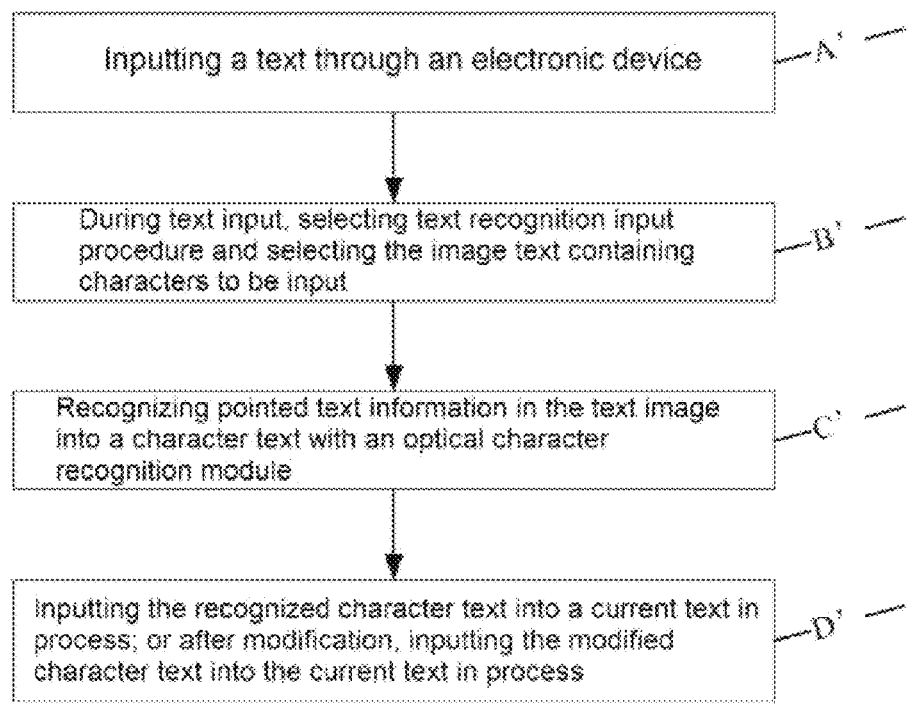
FIG. 5 shows the operation flow chart of the character input method consistent with the second embodiment of the current invention.

FIG. 5 discloses another embodiment of the current invention. This character input method includes the following steps;

A', inputting a text through an electronic device;

B', selecting a text recognition input procedure during text input and selecting a text image containing characters to be input;

C', recognizing the pointed text information into a character text through an optical character recognition module;

D', inputting the recognized character text into a current text in process; or inputting the modified character text into the current text in process after some modifications;

In step B', a user selects and marks the characters to be input on the display unit of the electronic device; in step D', the marked text image is recognized by the optical character recognition module. In step C', the input characters are marked by drawing a line, or drawing a box (such as a preview box), or using symbols to mark the beginning and the ending positions. The implementing scheme is described by means of setting a preview box as follows, and other marking modes can refer to the embodiment.

In step C', the display unit of the electronic device displays a selected box, and the selected box is adjusted to contain the characters to be input, so text information is thus defined; in step D', the defined text image in the selecting box is recognized by the optical character recognition module.

Selecting box setting enables the selected text information to be recognized more accurately to improve the recognition efficiency in step D'. Box setting selection is just an effective implemention scheme; it can also be neglected (or the selecting box is the display scope of the full display unit), in this case, in step D' all characters in the text image are recognized preliminarily; then a user needs to modify the recognized characters.

Preferably, step C' also includes a step of adjusting the shape of the selecting box through a selecting box adjusting module before the text image is photographed; a user adjusts the selecting box's shape through the selecting box adjusting module according to the scope of the input text. For example, a selecting box shown in FIG. 11 demonstrates one selecting box being adjusted into many selecting boxes; the selecting box can be in another shape such as a circle, an ellipse, a rhomb, etc.

If the display unit is a touch display, a user performs a touch action on the touch display unit to choose the selecting box's shape according to the scope of the input text; the selecting box adjusting module obtains the touch action to set the selecting box's shape according to the touch action.

If the display unit is a non-touch display unit, a user can draw a selecting box through a keyboard by, for example, adding a line through a menu, then adjusting the length of the line, moving the line through direction keys and finally completing a selecting box.

The above selecting box settings can improve the efficiency of recognition and information modification if a text image has an irregular shape.

Moreover, in step C', the optical character recognition module can automatically remove character rows/columns which are not completely photographed in the text image (such as character rows/columns nearby four edges of the rectangular selecting box, which are not completely photographed in the image), thereby reducing a user's work load of modification and further improving the editing efficiency.

In addition, the second character input method described in the second embodiment can also apply the same character directional marks as disclosed in the first embodiment. In the second embodiment, when a selecting box is set, a character direction mark is simultaneously set. The setting mode is similar to that disclosed in the first embodiment, so it is not repeated here.

The Third Embodiment

This method disclosed in the third embodiment requires an intelligent device provided with a built-in image device and a sortward of optical character recognition installed in the device; the memory of the device stores a program which controls and commands a computer processor to execute the following operations: starting the built-in camera or another imaging device, arranging characters to be input in a photography preview window, carrying out photography operation with the built-in camera or other imaging device, obtaining a text image containing the characters to be input, recognizing the characters in the text image with the optical character recognition technology, converting the recognized characters into a character string, and inputting the character string into a text processed by the device currently.

Figure 6:
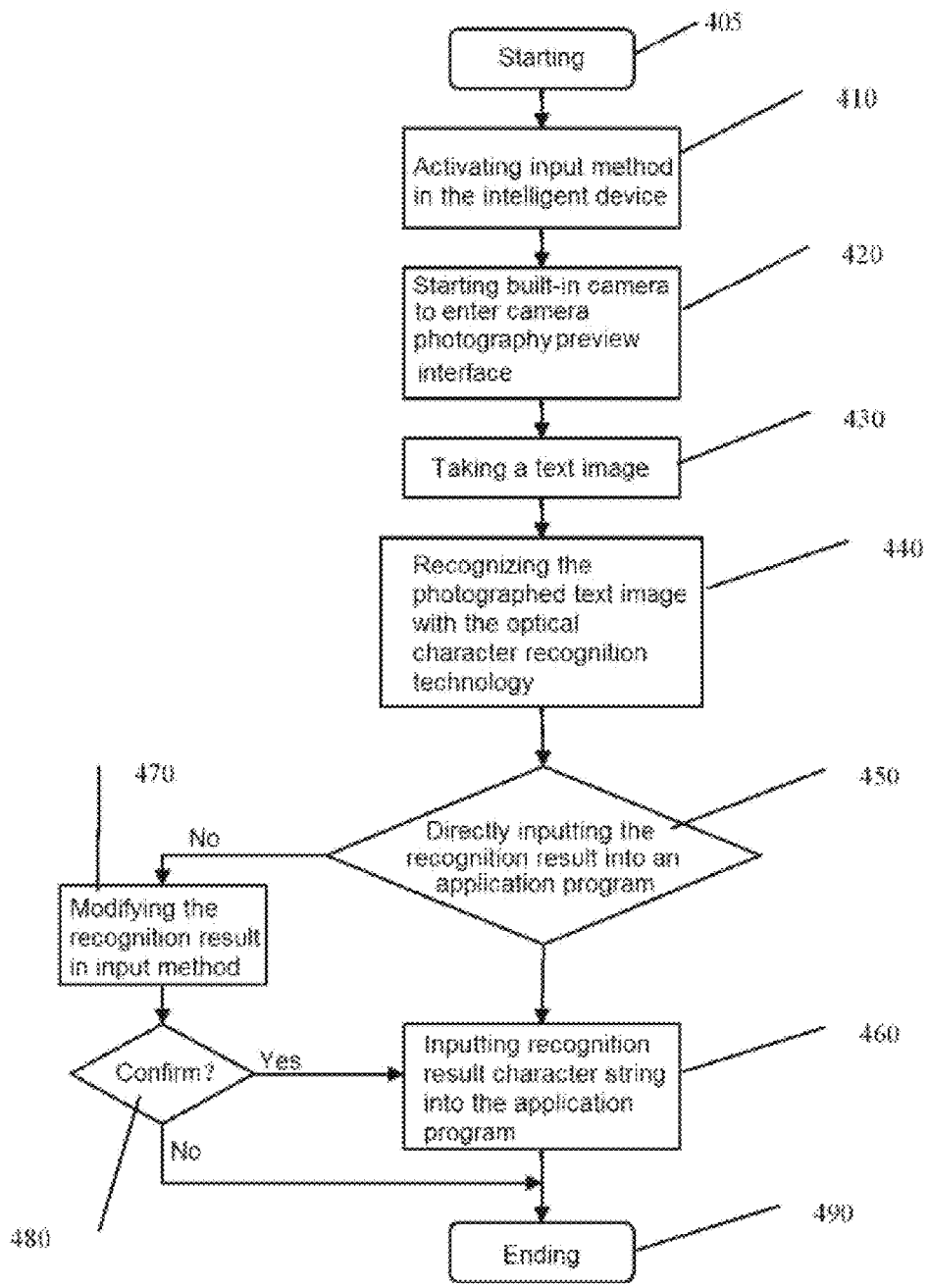
FIG. 6 shows the operation flow chart of the character input method consistent with the third embodiment of the current invention.

As shown in FIG. 6, the character recognition method in this embodiment comprises the following operation steps:

step 405, starting;

step 410, activating input method in the intelligent device;

step 420, starting the built-in camera, entering a photography preview interface, and displaying a camera photography preview box on a display;

step 430, taking a text image;

arranging characters to be input in the camera photography preview box, and taking the text image of the characters with the built-in camera;

step 440, recognizing the text image into a character text with the optical character recognition technology;

recognizing the text image processed in step 430 with the optical character recognition technology to obtain a corresponding character text;

step 450, inputting the character text into a current text in process directly or not;

a user decides whether or not to directly input the character text processed in step 440 into a current text in process, then goes to step 460 if yes, and goes to step 470 if not;

step 460, inputting the character text into the current text in process;

inputting the character text processed in step 440 into the current text in process, and then turning to step 490;

step 470, modifying the character text;

a user modifies the character text processed in step 440;

step 480 a user decides whether or not to input the character text processed in step 470 into the current text in process, then inputs the character text processed in step 470 into the current text in process if yes, and goes to step 490 if not;

step 490, ending.

Preferably, in step 420, select "camera input" in a pop-up input menu to start the built-in camera of the intelligent device (shown in FIG. 8); or in step 420, press a camera key of the intelligent device to start the built-in camera of the intelligent device; or in the step 420, click a camera icon to start the built-in camera of the intelligent device (shown in FIG. 9).

The Fourth Embodiment

The embodiment discloses a character input system, which can be performed in a touch-screen mobile phone based system; the mobile phone has a processor with sufficient memory capacity, and a camera having high resolution, and a high resolution display. For example, the camera has higher than 2 megapixel resolution, the display has at least 320×240 pixels.

In step 420, a user selects the "camera input" through turning on an input method switching menu to activate the method, prepares to input characters for the current text in process (as shown in FIG. 8), displays a photographed text image of characters in a camera input window on the touch-screen mobile phone, and then continues to perform all following steps. The camera captures the text image (step 430). The text image is recognized by the optical character recognition technology and converted into a character text (step 440). If the user selects to directly input the character text into the current text in process (step 450), the recognized character text is input into the text processed by the mobile phone currently (step 460). Till then, the character input operation is completed (490).

The Fifth Embodiment

This embodiment needs to be performed in a touch-screen mobile phone; the mobile phone has a processor with high working efficiency, for example, 200 MHz, high memory capacity, and a camera having high resolution, for example, 2 megapixel, and a high resolution display a.

In step 420, a user selects the "camera input" through turning on an input method switching menu to activate the method, prepares to input characters for the current text in process (as shown in FIG. 8), displays the photographed text image of characters in a camera input window on the touch-screen mobile phone, and then continues to perform all following steps. The camera captures the text image (step 430). The text image is recognized by the optical character recognition technology and converted into a character text (step 440). If the user selects not to directly input the character text into the current text in process (450), the mobile phone displays the character text on the touch screen to allow the user to modify the characters in the character text (470). The user determines whether to confirm the modified character text (480) or not, then inputs the confirmed character text into the text processed by the mobile phone currently if yes (step 460), and abandons the recognition result if not. Till then, the character input operation is completed (step 490).

The Sixth Embodiment

This embodiment differs from the first embodiment in that the embodiment also includes the step in the second embodiment. This embodiment includes marking input characters after step C when the photographing device takes a text image.

In this case, when the text image is photographed in step C, a user can set a preview box in the display unit, and the characters to be input are marked in this way; and then the user can further modify a selected text by the marking method in the second embodiment.

Or when the text is photographed in step C, the user selects the characters to be input by the selecting methods described in the second embodiment instead of setting a preview box in the display unit.

Therefore, the user can select characters and indicates character directions in the preview box, and the user can also use a selecting box in the photographed image or by other means; if both are used, the means of using a selecting box to select characters and indicate character direction in the photographed image is taken as final.

The forgoing description and application are merely illustrative of the invention, and above-mentioned embodiments are not to be construed in a limiting sense. Various changes and modifications may be made to the embodiments, replacement and various equal parts for the embodiments are public to those of ordinary skill in the art. It is apparent to the technicians in the files that the invention can be realized by other means, structures, layouts, ratios and other components, materials and parts without departing from the spirit and principles of the invention. Other changes and modification can be made to the disclosed embodiments without departing from the scope and spirit of the invention.

What is claimed is:

1. A character input method comprising the following steps:
   step A, inputting a text through an electronic device;
   step B, electing a photography input procedure and starting a photographing device during text input on the electronic device;
   step C, imaging a text image with the photographing device;
   step D, recognizing pointed text in the text image and converting the pointed text into a character text through an optical character recognition module; and
   Step E, inputting the converted character text into a current text in process, or inputting modified character text into the current text in process after some modifications;
   wherein the photographing device takes the text image, the display unit of the electronic device displays a preview box of the photographing device, wherein the preview box comprises characters to be input;
   wherein the optical character recognition module recognizes the pointed text image in the preview box;
   wherein the preview box comprises a mark of character direction for marking the direction of characters;
   wherein the step C also includes changing the character direction to be a horizontal character layout or a vertical character layout during text input; and
   wherein the optical character recognition module recognizes the characters according to the changed character direction.

2. The character input method of claim 1, wherein during text input, a user can select an image input procedure once or more times at any moment to start a process of inputting characters through the steps B to E, and the characters from this process and other input methods form a single text for this user.

3. The character input method of claim 1, wherein the steps C further includes a step of adjusting the shape of the preview box through a preview box adjusting module; a user can adjust the shape of the preview box through the preview box adjusting module according to the scope of the text to be input.

4. The character input method of claim 3, wherein the display unit is a touch display unit, and a user performs a touch action on the touch display unit to input a shape of the preview box according to the scope of the text to be input; the preview box adjusting module obtains the touch action to set the shape of the preview box according to the touch action.

5. The character input method of claim 1, wherein in the step B, select "camera input" in a pop-up input menu to start a built-in camera of the electronic device; or press a camera key of the electronic device to start the built-in camera of the electronic device; or click a camera input key on the keyboard to start up the built-in camera of the electronic device.

6. The character input method of claim 1, wherein further comprising marking characters to be input in the text image after step C, and the marked text image is recognized by the optical character recognition module in step D.

7. A character input system installed in an electronic device for inputting characters, wherein:
   the electronic device comprises:
   photographing device used for obtaining image information; and
   a display unit used for displaying various information;
   wherein the character input system comprises: an optical character recognition module for recognizing the pointed character image information obtained by the photographing device into a character text; electing a photography input procedure and starting a photographing device during text input on the electronic device; inputting the recognized character text into a current text in process, or inputting modified character text into the current text in process after some modifications; and imaging a text image with the photographing device;
   wherein the display unit comprises at least one image preview box of the photographing device to show the input text image;
   wherein a preview box adjusting module for adjusting the shape of the preview box of photographing device in the display unit according to the scope of the text image;
   wherein the optical character recognition module recognizes the pointed character image in the preview box;
   wherein the preview box comprises a mark of character direction for marking the direction of characters;
   wherein the character input system is configured to change the character direction to be a horizontal character layout or a vertical character layout during text input; and
   wherein the optical character recognition module recognizes the arrangement sequence of character according to the changed character direction.

8. The character input system of claim 7, wherein the display unit is a touch display unit; the user starting a touch action on the touch display unit to input the shape of the preview box according to the scope of the text image; and the preview box adjusting module sets the shape of the preview box according to the touch action.

9. The character input system of claim 7:
   wherein the display unit displays the text image in the preview box and displays the recognized characters in an input box disposed away from the preview box.

10. The character input system of claim 7, further comprising a keyboard for activating imaging actions.

11. A character input method, comprising the following steps:

A', inputting a text through an electronic device;

B', selecting a text recognition input procedure during text input on the electronic device and selecting a text image containing characters to be input;

C', recognizing the pointed text information in the text image into a character text through an optical character recognition module; and D', inputting the recognized character text into a current text in process; or inputting character text into the current text in process after a modification;

wherein the display unit of the electronic device displays a selected box comprising characters to be input through adjusting the selected box; the selected box comprises a mark of character direction for marking the direction of characters to be a horizontal character layout or a vertical character layout during text input;

wherein the pointed text image in the selected box is recognized by the optical character recognition module according to the character direction.

12. The character input method of claim 11, wherein a user can select a text recognition input procedure once or many times at any time to input characters through step B' to step D'.

13. The character input method of claim 11, wherein: step C' further comprising a step of adjusting the shape of the selecting box through a selecting box adjusting module; adjusting the shape of the selecting box through the selecting box adjusting module according the scope of the text to be input.

14. The character input method of claim 13, wherein:

the display unit is a touch display unit for input of the selecting box's shape according to the scope of the text to be input; and wherein the selecting box adjusting module obtains the touch action to set the selecting box's shape of the selecting box according to the touch action.

15. The character input method of claim 11, wherein: step C' further comprising: a step of the optical character recognition module automatically removing character rows/columns of the text image which are not completely photographed in the image.

16. The character input method of claim 11, wherein: step C' further comprising a user selecting characters to be input in the display unit of the electronic device and makes a mark; and step D' further comprising the marked text image is recognized by the optical character recognition module.

17. The character input method of claim 11, wherein: step C' further comprising marking the characters to be input by drawing lines, or drawing a box, or making the beginning and the ending positions with symbols.

18. A character input method comprising:

the method requires an intelligent device comprising a built-in camera and a function of optical character recognition; the device further comprising a memory that stores a program which controls and commands a processor to execute operations comprising: a first step by starting: preparing to input characters for the current text in process, activating the method, starting the built-in camera and entering a camera photography preview interface, arranging characters to be input in a photography preview window, carrying out photography operation with the built-in camera during text input, obtaining a text image containing the characters to be input, recognizing the characters in the text image with the optical character recognition technology, converting the recognized characters into a character string, and inputting the character string into a text processed by the device currently;

photographing a text image by the built-in camera, displaying the text image on a display unit of intelligent device, wherein the display unit comprises at least one image preview box to show the input text image;

recognizing the pointed text image in the preview box by an optical character recognition module; wherein the preview box comprises a mark of character direction for marking the direction of characters;

changing the character direction to be a horizontal character layout or a vertical character layout during text input; and recognizing the arrangement sequence of character according to the changed character direction by the optical character recognition module, wherein the first step comprises one of following acts:

selecting "camera input" in a pop-up input menu to start up the built-in camera in the intelligent device;

pressing a camera key of the intelligent device to start up the built-in camera of the intelligent device; or clicking a camera icon to start up the built-in camera of the intelligent device.

19. A character input method of claim 18, comprising step 430, taking a text image;

step 440, recognizing the text image and converting the text image into a character text with the optical character recognition technique;

step 450, inputting the character text into a current text in process;

moving to step 460 if yes, and moving to step 470 if not;

step 460, inputting the character text into the current text in process;

inputting the character text processed in step 440 into the current text in process, and then turning to step 490;

changing the character direction to be a horizontal character layout or a vertical character layout during text input;

step 470, modifying the character text; and step 480, determining if the character text is acceptable, inputting the accepted character text or ignore the rejected character text.

* * * * *